(12) United States Patent
Green et al.

(10) Patent No.: US 10,254,406 B2
(45) Date of Patent: Apr. 9, 2019

(54) SURVEYING PHYSICAL ENVIRONMENTS AND MONITORING PHYSICAL EVENTS

(71) Applicant: International Business Machines Corporation, Armonk, NY (US)

(72) Inventors: Byron S. Green, Poughkeepsie, NY (US); Budy D. Notohardjono, Poughkeepsie, NY (US); Arkadiy O. Tsfasman, Wappingers Falls, NY (US); John S. Werner, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/801,471

(22) Filed: Nov. 2, 2017

(65) Prior Publication Data

US 2018/0045828 A1    Feb. 15, 2018

Related U.S. Application Data

(63) Continuation of application No. 15/176,298, filed on Jun. 8, 2016.

(51) Int. Cl.

| | |
|---|---|
| *G01C 3/08* | (2006.01) |
| *G01S 17/50* | (2006.01) |
| *G01S 17/89* | (2006.01) |
| *G01S 17/02* | (2006.01) |
| *G01S 17/66* | (2006.01) |

(Continued)

(52) U.S. Cl.
CPC ............ *G01S 17/50* (2013.01); *G01S 7/4808* (2013.01); *G01S 17/023* (2013.01); *G01S 17/66* (2013.01); *G01S 17/89* (2013.01); *G01S 17/36* (2013.01); *G01S 17/42* (2013.01)

(58) Field of Classification Search
CPC . G01S 17/50; G01S 17/89; G01S 3/08; G01C 11/00; G06T 17/00; G06T 19/00
See application file for complete search history.

(56) References Cited

U.S. PATENT DOCUMENTS

| | | | |
|---|---|---|---|
| 7,174,277 | B2 | 2/2007 | Vock et al. |
| 8,504,292 | B1 | 8/2013 | Cote et al. |

(Continued)

FOREIGN PATENT DOCUMENTS

| | | |
|---|---|---|
| CN | 102521110 A | 6/2012 |
| CN | 102914357 A | 2/2013 |

(Continued)

OTHER PUBLICATIONS

Della Cava, Marco, "Google car hits bus, first time at fault", USA Today, Feb. 29, 2016, 2 pages, printed on Apr. 21, 2016, <http://www.usatoday.com/story/tech/news/2016/02/29/google-car-hits-bus-first-time-fault/81115258/>.

(Continued)

*Primary Examiner* — Samantha K Abraham
(74) *Attorney, Agent, or Firm* — Monchai Chuaychoo

(57) ABSTRACT

A computer-implemented method includes receiving surveying data from a proximity barrier survey device. The proximity barrier survey device is mounted to a package. The package is located within a physical environment. The method includes generating a map based on the surveying data. The method includes tracking movement within the physical environment based on the map and the surveying data.

1 Claim, 3 Drawing Sheets

(51) Int. Cl.
*G01S 7/48* (2006.01)
*G01S 17/36* (2006.01)
*G01S 17/42* (2006.01)

(56) References Cited

U.S. PATENT DOCUMENTS

| 9,043,657 B2 | 5/2015 | Notohardjono et al. |
| 2009/0262974 A1 | 10/2009 | Lithopoulos |
| 2010/0092079 A1* | 4/2010 | Aller .................. G06K 9/3216 382/165 |
| 2015/0046364 A1 | 2/2015 | Kriss |
| 2015/0154554 A1 | 6/2015 | Skaaksrud |
| 2016/0300183 A1 | 10/2016 | Berger et al. |

FOREIGN PATENT DOCUMENTS

| CN | 103941264 A | 7/2014 |
| CN | 104897161 A | 9/2015 |
| CN | 105300638 A | 2/2016 |
| EP | 2325655 B1 | 10/2014 |

OTHER PUBLICATIONS

"Method and System for Real-time Monitoring of Vibration during Shipment of Server Computer", An IP.com Prior Art Database Technical Disclosure, Authors et. al.: Disclosed Anonymously, IP.com No. IPCOM000220023D, IP.com Electronic Publication Date: Jul. 18, 2012, 3 pages, <http://ip.com/IPCOM/000220023>.

"Microcomputer Applications in Process Plant Maintenance", An IP.com Prior Art Database Technical Disclosure, IP.com No. IPCOM000218794D, IP.com Electronic Publication Date: Jun. 7, 2012, 2011, KBR (Kellogg Brown & Root, LLC), 10 pages, <http://ip.com/IPCOM/000218794>.

Green et al., "Surveying Physical Environments and Monitoring Physical Events", U.S. Appl. No. 15/176,298, filed Jun. 8, 2016, 18 pages.

IBM, Appendix P, list of patents or patent applications treated as related, filed herewith, 2 pages.

* cited by examiner

SURVEYING PHYSICAL ENVIRONMENTS AND MONITORING PHYSICAL EVENTS

BACKGROUND

The present invention relates generally to the field of surveying technology, and more particularly to generating maps based on surveying data.

Surveying is determining the terrestrial or three-dimensional position of points and the distances and angles between them. Surveying works with elements of geometry, trigonometry, regression analysis, physics, and engineering. Surveying technology may include total stations, retroreflectors, 3D scanners, or surveying software. Surveying technology may be used to generate maps. Surveying technology may use the global positioning system (GPS) receiver devices. However, these GPS receiver devices may not be able to survey indoor physical environments with a high level of accuracy, or be able to survey indoor physical environments at all.

SUMMARY

According to an embodiment of the present invention, a computer-implemented method comprising: receiving surveying data from a proximity barrier survey device comprising at least one of a lidar based device, an accelerometer or an altimeter, the proximity barrier survey device mounted to a package, the package located within a physical environment; generating a three-dimensional map based on the surveying data wherein the surveying data comprises dimensions for the physical environment, dimensions for objects within the physical environment and dimensions of placement of the objects placed within the physical environment; tracking movement of the package within the physical environment based on the map and the surveying data; recording the movement of the package within the physical environment; generating an animated map of the package within the physical environment; identifying, based on said surveying data, an impact event wherein the package experiences a shock greater than a predetermined threshold; and recording at least one of an impact time or an impact position for the impact event, and a magnitude of the impact event.

DETAILED DESCRIPTION

Figure 1:
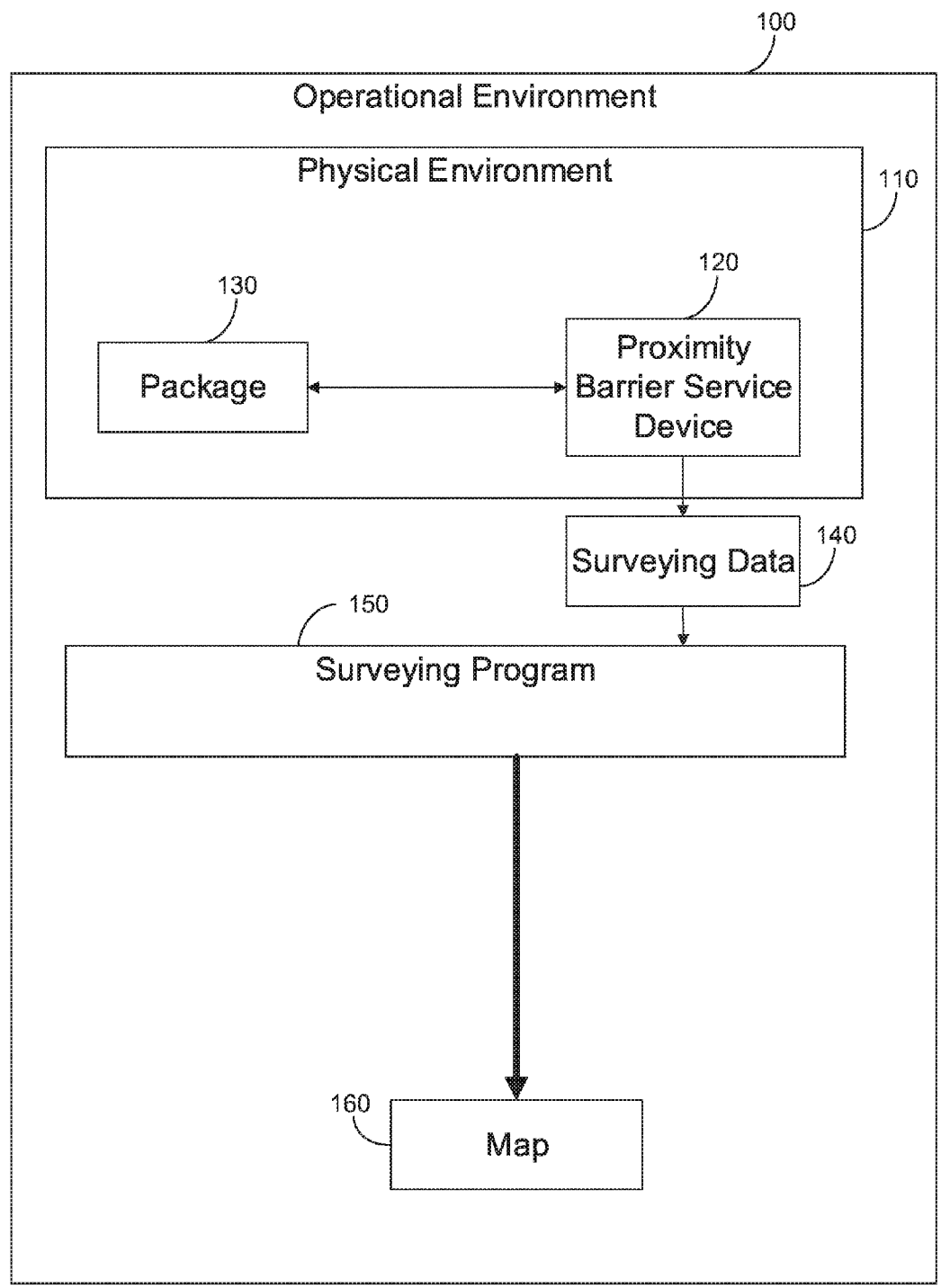
FIG. 1 is a block diagram of an operational environment suitable for operation of a surveying program, in accordance with at least one embodiment of the present invention.

Referring now to the invention in more detail, FIG. 1 is a block diagram displaying an exemplary operational environment suitable for operation of at least one embodiment of the invention. An operational environment 100 may include a physical environment 110, a package 130, a proximity barrier service device 120, a surveying data 140, a surveying program 150, and a map 160, all in mutual communication and interconnected via the operational environment 100. The operational environment 100 may be a cloud-based, virtual, or distributed environment or a remote environment on defined server hardware, or, more generally, the operational environment 100 may be any type of environment suitable for access by the surveying program 150.

The physical environment 110 may be a physical location, such as a floor of a building, a room, and/or a hallway. The physical environment 110 may include physical objects, such as the package 130. The package 130 may be, for example, a server or a computing device. The physical environment 110 also includes the proximity barrier service device 120. The proximity barrier service device 120 may be mounted to the package 130. The proximity barrier service device 120 may be a lidar based device. A lidar based device is a surveying technology that measures distance by illuminating a target with a laser light. Lidar exists as an acronym of Light Detection and Ranging. Lidar surveying technology is able to hide facial details, names, signs, texts, computer screens, and other potentially confidential information. The proximity barrier service device 120 may be an accelerometer. An accelerometer is a device that measures proper acceleration. Single- and multi-axis accelerometers may detect magnitude and direction of proper acceleration, orientation, coordinate acceleration, vibration, shock, falling, and other types of movement. The proximity barrier service device 120 may be an altimeter. An altimeter is an instrument used to measure the height of an object, such as the package 130. For example, the altimeter may determine the height of the package 130 in order to determine what floor of a building the package 130 is on or if the package 130 is travelling via a ramp, elevator, or stairs. In some embodiments, multiple proximity barrier service devices, such as the proximity barrier service device 120 may be mounted to the package 130. In some embodiments, the proximity barrier service device 120 includes a lidar based device, an accelerometer, and an altimeter. In general, the proximity barrier service device 120 is able to collect data about the package 130, other objects within the physical environment 110 and/or the physical environment 110. The collected data is the surveying data 140. For example, in embodiments where the proximity barrier service device 120 is a lidar based device, the surveying data 140 may include distance data, such as the package 130's distance to other objects and barriers within the physical environment 110.

In other embodiments where the proximity barrier service device 120 is a lidar based device, the surveying data 140 may include data collected from a laser, scanner, a photodetector and receiver electronic, and/or a position and navigation system, all of which are components of a lidar based device. In some embodiments, the lidar based device may include arrays of high speed detectors and modulation sensitive detector arrays. The high speed detectors and modulation sensitive detector arrays may generate each pixel of the map 160 (for embodiments where the map 160 is a raster image) via local processing within the lidar based device, such as demodulation or gating at high speed, downconverting the signals to video rate so that the array may be read like a camera. In such an embodiment, the surveying data 140 includes the array. In some embodiments, the proximity barrier service device 120 is a high resolution 3D lidar camera using homodyne detection with an electronic charge-coupled device or complementary metal-oxide-semiconductor shutter.

The surveying program 150 is capable of receiving the surveying data 140 from the proximity barrier service device 120 and generating the map 160 based on the surveying data

140. For example, the surveying data 140 may include distance data obtained from a lidar based proximity barrier service device.

The map 160 may be a symbolic depiction highlighting relationships between elements (for example, the package 130) of a space, such as the physical environment 110. The map 160 may be a two-dimensional representation of the physical environment 110 or a three-dimensional representation of the physical environment 110. The surveying program 150 may generate the map 160 using the surveying data 140. For example, the surveying data 140 may include dimensions for the physical environment 110, dimensions for the objects within the physical environment 110, and dimensions for how the objects are placed within the physical environment 110. In some embodiments, a combination of data from a lidar based device and an altimeter may enable the surveying program 150 to generate the map 160. For example, a lidar based device may determine distances between various objects and barriers within the physical environment and an altimeter may determine heights for various objects. In such an embodiment, the surveying program 150 may generate a three-dimensional map. In other embodiments, the surveying program 150 may generate a three-dimensional map based on surveying data from a lidar based device. In such an embodiment, the surveying data 140 may include data from a lidar based device performing a laser scanning or 3D scanning.

Figure 2:
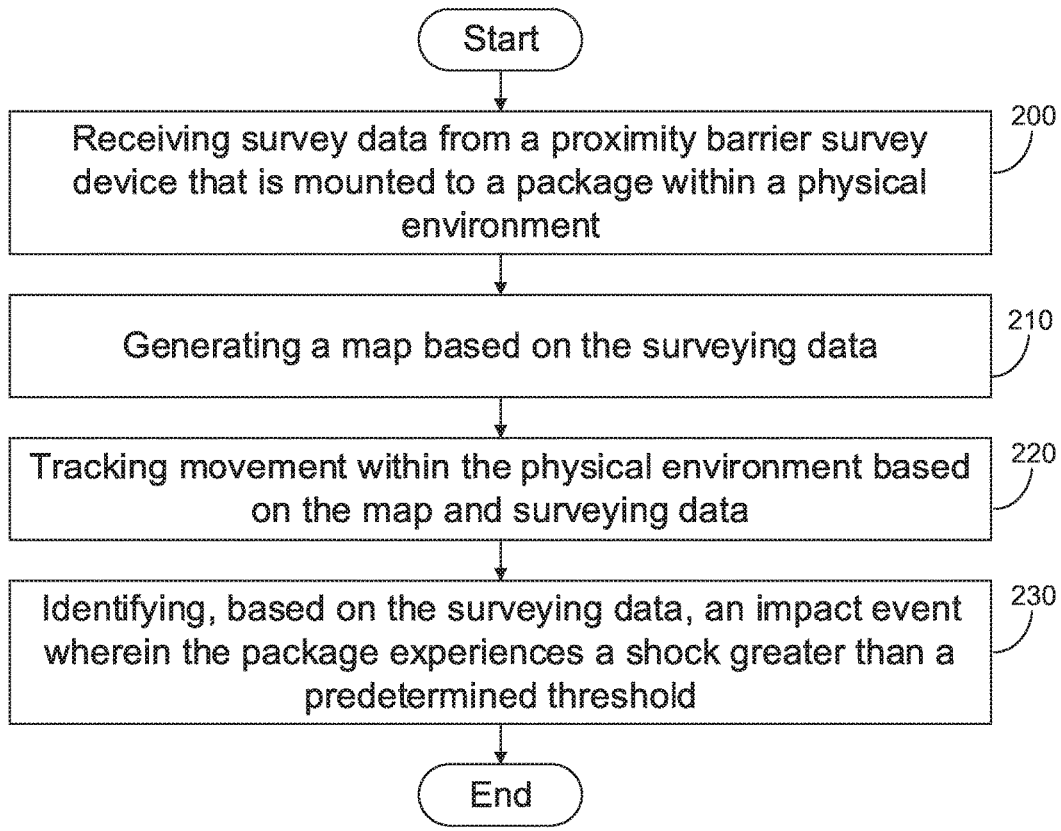
FIG. 2 is a flowchart depicting operational steps for a surveying program, in accordance with at least one embodiment of the present invention.

FIG. 2 is a flowchart depicting the operational steps of the surveying program 150, executing within the operational environment 100 of FIG. 1, in accordance with an embodiment of the present invention.

At step 200, the surveying program 150 receives the surveying data 140 from the proximity barrier service device 120. Receiving may include a user explicitly calling the surveying program 150 from a command line interface using a reference to the surveying data 140 as an argument. Alternatively, receiving may include automated calls to the surveying program 150, for example, from an integrated development environment or as part of a surveying program management system.

At step 210, the surveying program 150 generates the map 160 based on the surveying data 140. In some embodiments, the surveying data 140 includes data from a lidar based device, such as the proximity barrier service device 120. In such an embodiment, the lidar based device may survey the physical environment 110 to collect distance and topological data such that the surveying program 150 is able to generate the map 160. In such an embodiment, the surveying data 140 may include data such that the map 160 is a three-dimensional map. The lidar based device may scan the physical environment 110 via a laser scan or a 3d scan and obtain distance and topological data for the physical environment 110 and elements within the physical environment 110. The surveying program 150 may construct the map 160 by plotting the distance and topological data received from the lidar based proximity barrier service device at step 200.

The proximity barrier service device 120 may continuously, regularly, or periodically survey the physical environment 110. The surveying program 150 may continuously, regularly, or periodically receive updated surveying data from the proximity barrier service device 120 based on the proximity barrier service device 120 continuously, regularly, or periodically surveying the physical environment 110. The surveying program 150 may continuously, regularly, or periodically update the map 160 based on receiving updated surveying data from the proximity barrier service device 120. In some embodiments, the surveying program 150 may compare the updated surveying data to the surveying data 140 and only update the map 160 if there are differences between the updated surveying data and the surveying data 140.

At step 220, the surveying program 150 tracks movement within the physical environment 110 based on the map 160 and the surveying data 140. Tracking may include monitoring differences between the updated surveying data and the surveying data 140. Monitoring may include logging the differences and cataloging when the differences occur. In some embodiments, monitoring may include recording the differences. For example, differences may be that an object, such as the package 130, has moved within the physical environment 110. Such movement data may be obtained by an accelerometer, such as the proximity barrier service device 120. In such an embodiment, the surveying program 150 may record maps generated before the movement, during the movement, and after the movement. In such an embodiment, the surveying program 150 may generate multiple maps depicting how the physical environment 110 appeared at a particular moment in time, order the multiple maps chronologically and generate an animated map, such as a video, via the multiple maps.

At step 230, the surveying program 150 identifies, based on the surveying data 140 and/or the updated surveying data, an impact event. The impact event is an event in which the package 130 experiences a shock greater than a predetermined threshold. The shock may be indicated by movement, as determined by an accelerometer, an altimeter, or a lidar based device. The shock may include dynamic forces resulting from movement that cause the package 130 to experience acceleration. The shock may be determined based on the magnitude of the acceleration. The magnitude of the acceleration may be determined by tracking the movement of the package 130 and/or tracking movement that is distinct from movement detected by an onboard accelerometer within the package 130 or on the proximity barrier service device 120 that is attached to the package 130. The surveying program 150 may also consider height changes during movement to determine the shock the package 130 experiences. For example, if the package 130's altitude changes by two inches as the package 130's distance changes by one foot, the surveying program 150 may determine that the shock the package 130 experiences is low because the package 130 may be, for example, being transported down a ramp. In some embodiments, the proximity barrier service device 120 may include a force gauge or dynamometer. In such an embodiment, the surveying program 150 may receive the surveying data 140 and/or updated surveying data that includes when the force gauge or dynamometer detects that the package 130 has experienced a shock greater than a predetermined threshold. In some embodiments, the surveying program 150 may generate an animated map illustrating the physical environment 110 before, during, and after the package 130 experienced a shock greater than a predetermined threshold. In some embodiments, the magnitude of the impact is recorded if the package 130 experiences a shock greater than a predetermined threshold.

In some embodiments, the surveying program 150 may record movement associated with the impact event. Recording movement associated with the impact event may include recording maps generated by the surveying program 150 from before, after, and/or during the impact event. Recording movement associated with the impact event may also include animating the recorded maps to create a video of the impact event. Recording the impact event may include when and where the impact event took place. In some embodiments, the surveying program 150 records an impact time for the impact event. In such an embodiment, timestamp data may be within the surveying data 140. In some embodiments, the surveying program 150 records an impact position for the impact event. In such an embodiment, location data, coordinate data may be within the surveying data 140.

In some embodiments, the surveying program 150 monitors impact events associated with the package 130 by receiving input from a lidar sensor, an altitudinal sensor, and an accelerometer, all of which are mounted to the package 130. The surveying program 150 receives location data from the lidar sensor, altitude data from the altitudinal sensor, and acceleration data from the altitudinal sensor. In such an embodiment, the surveying program 150 generates a map, such as the map 160, based on the location data, the altitude data, and said acceleration data. In such an embodiment, the map 160 may be three-dimensional and animated.

Figure 3:
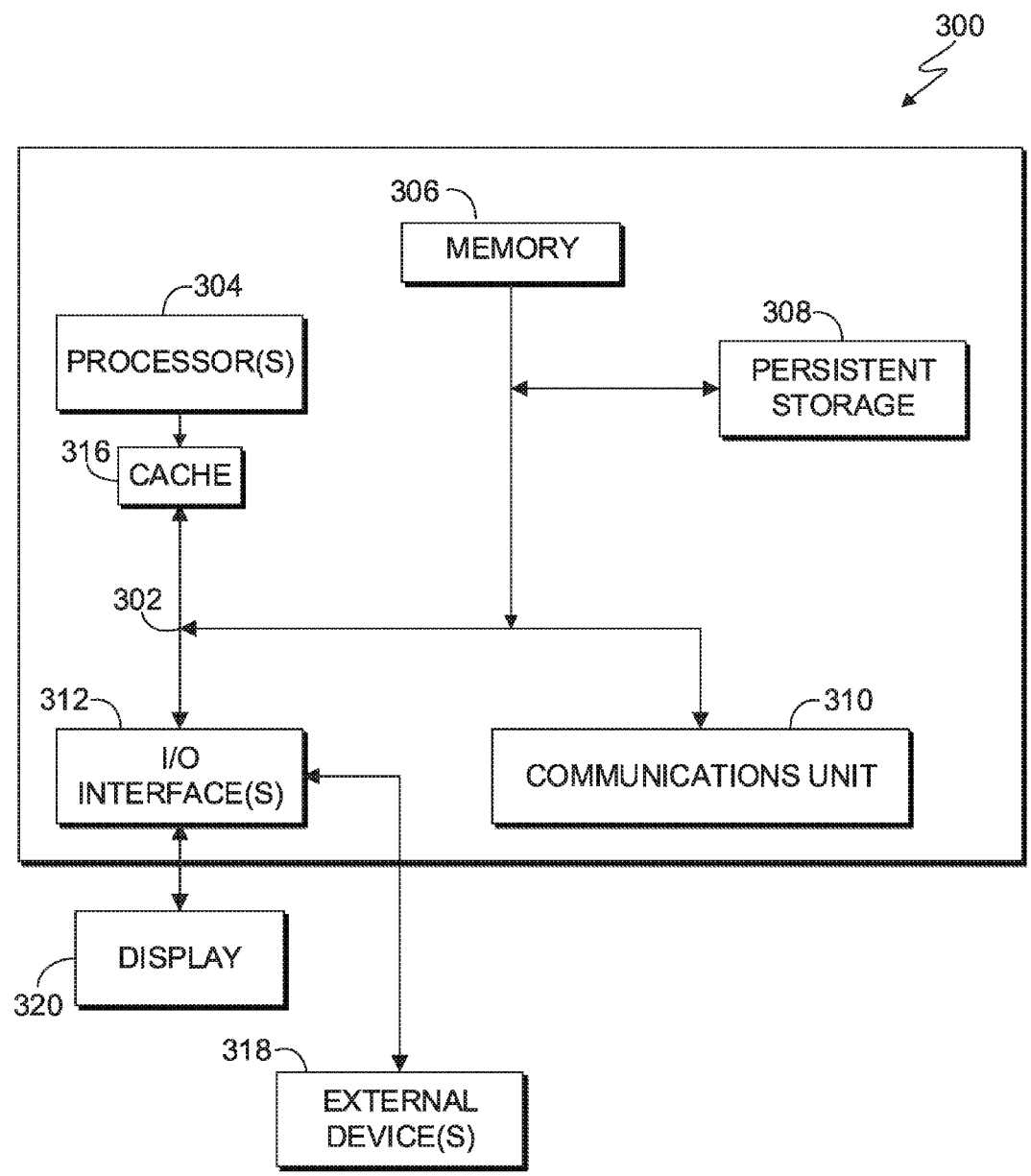
FIG. 3 is a block diagram of components of an operational apparatus suitable for executing a surveying program, in accordance with at least one embodiment of the present invention.

FIG. 3 is a block diagram depicting components of a computer 300 suitable for executing the surveying program 150. FIG. 3 displays the computer 300, the one or more processor(s) 304 (including one or more computer processors), the communications fabric 302, the memory 306, the RAM 316, the cache 316, the persistent storage 308, the communications unit 310, the I/O interfaces 312, the display 320, and the external devices 318. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the cache 316, the computer processor(s) 304, the memory 306, the persistent storage 308, the communications unit 310, and the input/output (I/O) interface(s) 312. The communications fabric 302 may be implemented with any architecture suitable for passing data and/or control information between the processors 304 (e.g., microprocessors, communications processors, and network processors, etc.), the memory 306, the external devices 318, and any other hardware components within a system. For example, the communications fabric 302 may be implemented with one or more buses or a crossbar switch.

The memory 306 and persistent storage 308 are computer readable storage media. In the depicted embodiment, the memory 306 includes a random access memory (RAM). In general, the memory 306 may include any suitable volatile or non-volatile implementations of one or more computer readable storage media. The cache 316 is a fast memory that enhances the performance of computer processor(s) 304 by holding recently accessed data, and data near accessed data, from memory 306.

Program instructions for the surveying program 150 may be stored in the persistent storage 308 or in memory 306, or more generally, any computer readable storage media, for execution by one or more of the respective computer processors 304 via the cache 316. The persistent storage 308 may include a magnetic hard disk drive. Alternatively, or in addition to a magnetic hard disk drive, the persistent storage 308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 310, in these examples, provides for communications with other data processing systems or devices. In these examples, the communications unit 310 may include one or more network interface cards. The communications unit 310 may provide communications through the use of either or both physical and wireless communications links. The surveying program 150 may be downloaded to the persistent storage 308 through the communications unit 310. In the context of some embodiments of the present invention, the source of the various input data may be physically remote to the computer 300 such that the input data may be received and the output similarly transmitted via the communications unit 310.

The I/O interface(s) 312 allows for input and output of data with other devices that may operate in conjunction with the computer 300. For example, the I/O interface 312 may provide a connection to the external devices 318, which may include a keyboard, keypad, a touch screen, and/or some other suitable input devices. External devices 318 may also include portable computer readable storage media, for example, thumb drives, portable optical or magnetic disks, and memory cards. Software and data used to practice embodiments of the present invention may be stored on such portable computer readable storage media and may be loaded onto the persistent storage 308 via the I/O interface(s) 312. The I/O interface(s) 312 may similarly connect to a display 320. The display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for surveying indoor physical environments comprising:
    receiving surveying data from a proximity barrier survey device consisting of a lidar based device, an accelerometer and altimeter, wherein the proximity barrier survey device is mounted to a package, wherein the package located within a physical environment;
    generating a three-dimensional map based on the surveying data wherein the surveying data comprises dimensions for the physical environment, dimensions for objects within the physical environment and dimensions of placement of the objects placed within the physical environment;
    tracking movement of the package within the physical environment based on the map and the surveying data;
    recording the movement of the package within the physical environment;
    generating an animated map of the package within the physical environment;
    identifying, based on said surveying data, an impact event wherein the package experiences a shock greater than a predetermined threshold; and
    recording at least one of an impact time or an impact position for the impact event, and a magnitude of the impact event.

* * * * *